March 15, 1960  R. N. HALL  2,928,882
PURIFICATION OF AQUEOUS LIQUORS CONTAINING PHENOL
Filed May 1, 1958
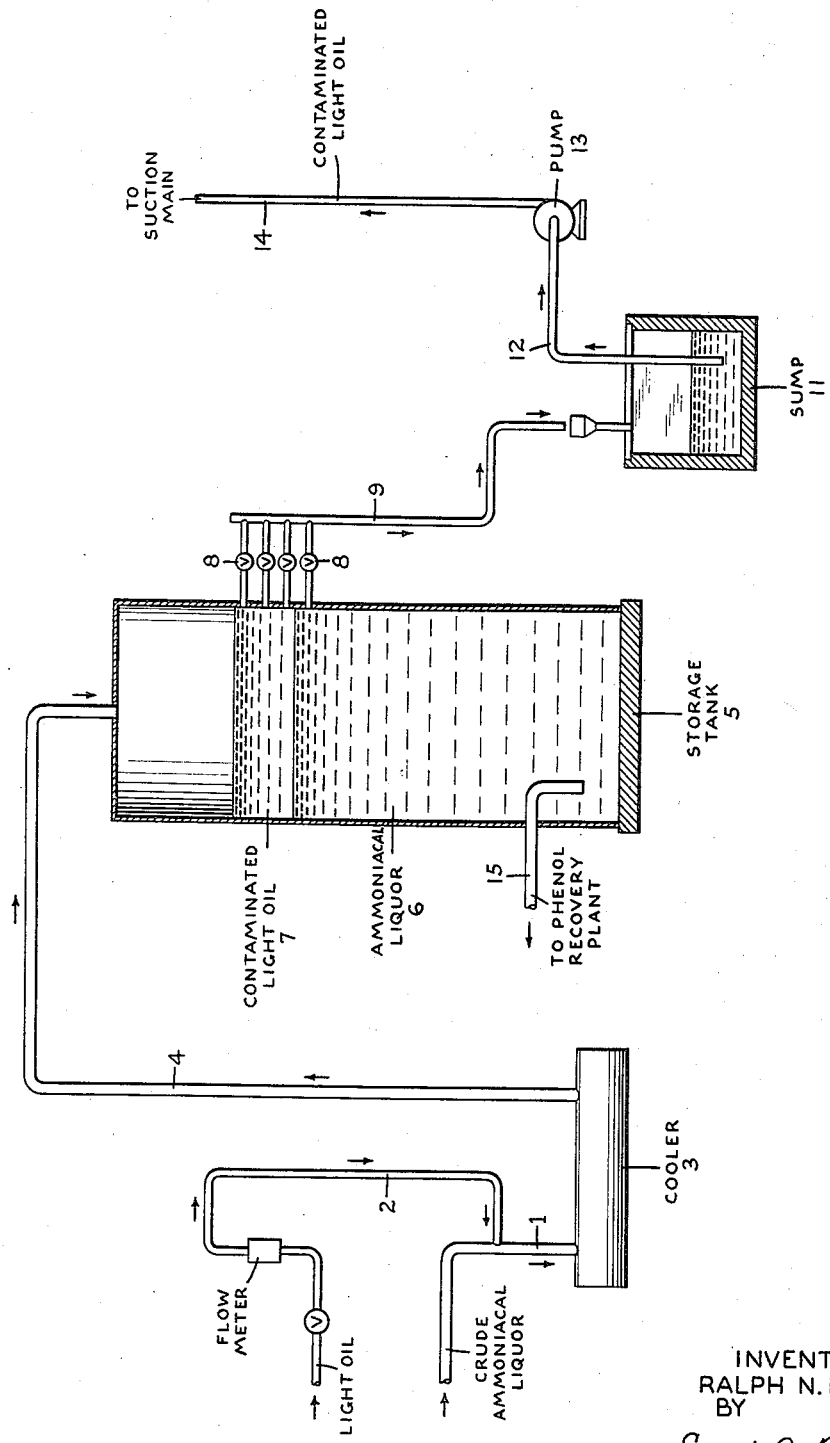
INVENTOR
RALPH N. HALL
BY
Ernest A. Polin
ATTORNEY

United States Patent Office 2,928,882
Patented Mar. 15, 1960

2,928,882

PURIFICATION OF AQUEOUS LIQUORS CONTAINING PHENOL

Ralph Nelson Hall, Denville, N.J., assignor to Allied Chemical Corporation, a corporation of New York Application May 1, 1958, Serial No. 732,220

9 Claims. (Cl. 260—627)

This invention relates to the dephenolization of industrial crude liquors containing tars and carbonaceous materials, and more particularly refers to a new and improved method for the removal and recovery of phenol from coke-plant ammoniacal liquor.

In the carbonization of coal there is produced roughly about one pound of phenol per ton of coal. About 90% of this phenol is recovered in conventional coke-plant phenol recovery systems, and about 10% of the phenol ultimately escapes to the sewer and thus to the river, lake or stream. While the amount of phenol per ton of coal carbonized is small, this value when multiplied by the millions of tons of coal carbonized annually aggregates a substantial total tonnage of phenol lost. Of equal and perhaps greater importance is the pollution effect of the phenol, making it desirable and, indeed, mandatory to eliminate the phenol contaminant of liquor before discharging it into the body of water.

The conventional method of removing phenol from coke-plant ammoniacal liquor generally involves washing the liquor with a fluid which has a preferential affinity for phenol, followed by separating the phenol from the wash fluid and returning the stripped wash fluid for further removal of phenol from the liquor. A typical method is to pass a solvent oil countercurrent to the liquor in a column to extract phenol and then to treat the solvent oil with caustic to remove the phenol as sodium phenolate and return the solvent oil for further contact with the liquor.

When, however, the phenol-containing industrial liquor contains tars and carbonaceous materials, as is the case with coke-plant ammoniacal liquor, the solvent oil soon becomes fouled so that it must be purified before being used again or discarded and replaced with fresh solvent oil. Moreover, and perhaps even more important, the tars and carbonaceous materials tend to form emulsions between the treated liquor and the solvent oil. This impairs the degree of efficiency of the extraction, decreases the output of the plant and causes losses of solvent oil. As a result, such operation has necessitated apparatus shutdown and cleanout or periodic by-passing of certain equipment to pump out the emulsified layer.

It has been proposed to remove particles of tars from industrial phenolic liquors by treating them with an adsorbent such as calcium carbonate, alumina, sawdust, wood-charcoal, etc., which fix and bind the finely divided and suspended particles of tar. The dirty mass so produced is separated, and the clarified liquor is then extracted with a suitable solvent oil, such as benzene, to dissolve the phenol. This procedure possesses the obvious economic and process disadvantages of requiring a filtration step to remove the contaminated adsorbent.

There have been other proposals for removing tars from industrial phenolic liquors which involve employment of filters, centrifuges or similar type filtering equipment. These costly procedures have been very troublesome and unsatisfactory.

An object of the present invention is to provide an efficient and economical process for selectively removing tars and carbonaceous materials from industrial phenolic liquors.

Another object of the invention is to provide an efficient and economical process for selectively removing tars and carbonaceous materials from coke-plant ammoniacal liquor.

A further object is to provide a two-stage process for removing phenol from industrial liquors containing tars and carbonaceous materials, such as coke-plant ammoniacal liquor, whereby process and apparatus difficulties are avoided.

Other objects and advantages of the invention will be apparent from the following description and accompanying drawing.

In accordance with the process of the present invention, aqueous liquor containing phenol, as well as tars and carbonaceous materials, is mixed with a solvent for phenol which is immiscible in water and has a lower specific gravity than water, in proportion of about 0.5 to 10 volumes, preferably about 1 to 2 volumes of solvent to 100 volumes of liquor, thereby producing a mixture which separates into two layers, a non-aqueous layer containing solvent and substantially all of the tars and carbonaceous materials originally present in the liquor and an aqueous layer containing liquor and relatively all (except for a fraction of a percent) of the phenol originally present in the liquor, and separating said non-aqueous and aqueous layers. The aqueous layer may then be subjected to extraction with a solvent for phenol in conventional manner to remove the phenol from the liquor. After removal of the phenol, the solvent, hereinafter referred to as system solvent, may be recycled for mixing with fresh aqueous liquor to be treated.

The process of this invention is applicable to any aqueous industrial phenolic liquor which is contaminated with tars and carbonaceous materials. The term "phenol" as used herein is intended to include the homologs of phenol such as cresols and xylols.

Any liquid solvent for phenol which is immiscible in water and has a lower specific gravity than water may be employed for the removal of tars and carbonaceous materials in the process of the present invention. These liquid solvents include benzene, toluene, xylenes and hydrocarbon fractions rich in one or more of the aforementioned aromatic hydrocarbons. I have found in treating coke-oven ammoniacal liquor that light oils (aromatic hydrocarbon oils having a boiling point of about 175° to about 350° F. and comprising benzene, toluene and xylenes) are particularly suitable. As indicated above, the solvent may suitably be system solvent recovered from dephenolization operation.

The liquid solvent is employed in amount to extract from the liquor only a small portion of the phenol present therein. The ratio of liquid solvent to liquor will vary, depending in part upon the concentration of the tars and carbonaceous materials in the liquor as well as the nature of the solvent. Generally speaking, volume ratios of solvent to liquor in the proportions of about 0.5 to 10:100, and preferably in the proportions of 1 to 2:100 are employed. We have found that when the liquor is mixed with such controlled amount of solvent, substantially all of the tars and carbonaceous materials originally present in the liquor are selectively extracted. The resulting liquor is substantially free from tars and carbonaceous materials and may then be subjected to conventional phenol extraction without encountering process and apparatus difficulties.

Although it is preferred to operate the process of this invention in continuous manner, batch operation may also be employed.

The accompanying drawing is a diagrammatic flow sheet illustrating one method of practicing the invention.

Referring to the drawing, the feed material entering through line 1 may be any aqueous industrial liquor containing phenol, usually in small amounts, generally less than 10% by volume of the liquor and often less than 1%, and contaminated with tars and carbonaceous materials. More specifically, the feed material may be coke-plant ammoniacal liquor, which is fed to the ammonia still operations of a coke plant. This liquor, which is essentially free from light oils, consists principally of water containing ammonia and phenol and is contaminated with tars and carbonaceous materials. While the amount of phenol in coke-plant ammoniacal liquor varies in each plant, a phenol concentration of from about 0.50 to 5.0 grams per liter may be considered as typical. For example, the material entering line 1 is an ammoniacal liquor which is the excess portion of the liquor used for the flushing of hot coke oven gas. This liquor which contains 3.0 to 20.0 grams per liter ammonia, 0.70 to 4.0 grams per liter phenol, 3 to 15 grams per liter tars and carbonaceous materials and small amounts of acid gases (usually hydrogen sulfide and carbon dioxide) and salts enters line 1 at a temperature of about 65° to 90° C.

A solvent for phenol which is immiscible in water and has a lower specific gravity than water is introduced through a flow meter into line 2 and mixes with the liquor in line 1. In coke-plant ammoniacal liquor treatment, this solvent is desirably system light oil (i.e., an aromatic hydrocarbon oil having a boiling point of about 175° to about 350° F. and comprising benzene, toluene and xylenes) from a phenol recovery plant. The volume ratio of light oil to liquor is about 0.5 to 10:100 and preferably about 1 to 2:100. The mixture of light oil and liquor is passed to a cooler 3 which may be of any suitable conventional construction, wherein the mixture is cooled by indirect heat exchange with water passing through jacketed pipes to a temperature of about 35° to 50° C., preferably about 40° to 45° C. The cooled mixture is then passed via line 4 to liquor storage tank 5. Intimate mixing of the light oil and liquor occurs by means of turbulent action in cooler 3 and line 4. If desired, mixing can also be effected by means of contact in a scrubber or in a coiled pipe or as a result of recirculation by means of a pump.

In tank 5 substantially all of the tars and carbonaceous materials originally present in the liquor are either dissolved by the light oil or are affected by a specific gravity change whereby they are retained in the light oil, and only a fraction of a percent of the phenol originally present in the liquor is extracted by the light oil. A lower aqueous layer 6 of liquor containing relatively all of the phenol originally present in the liquor forms, underlying an upper non-aqueous layer 7 of contaminated light oil.

Tank 5 is provided with valved drain connections 8 for removal of contaminated light oil via line 9 to a sump 11. The contaminated light oil is discharged from sump 11 through line 12 and is pumped by means of a conventional pump 13 through line 14 to a suitable facility for the recovery of the oil, e.g., to a coke oven gas suction main. In the suction main the oil is vaporized into a stream of coke oven gas and is subsequently recovered.

If desired, the contaminated oil from sump 11 can be satisfactorily treated in a light oil rectifying column, the tars and carbonaceous matter being discharged as bottoms.

Liquor substantially free from tars and carbonaceous materials is withdrawn from tank 5 via line 15. This liquor may then be subjected to conventional phenol extraction without encountering process difficulties.

The process described above avoids troublesome emulsions in the system, avoids the necessity of cleaning out equipment, maintains a clean system solvent and enables the production of a phenol product which is substantially free from tars and carbonaceous materials. In addition, the process permits maintenance of a clean ammonia still in subsequent operations.

The following example illustrates the present invention.

*Example*

Ammoniacal liquor from a coke plant containing about 10 grams per liter ammonia, about 3.0 grams per liter phenol and contaminated with about 3.0 grams per liter tars and carbonaceous materials is introduced at the rate of 200,000 gallons per day through line 1. System light oil from a phenol recovery plant is introduced through line 2 at the rate of 2000 gallons per day. The volume ratio of light oil to liquor is about 1:100. The mixture of liquor and light oil is passed to cooler 3 wherein the mixture is cooled to a temperature of about 40° C. The cooled mixture is then passed via line 4 to liquor storage tank 5. Intimate mixing of the light oil and liquor occurs by means of turbulent action in cooler 3 and line 4.

In tank 5 the mixture forms two layers, an upper light oil layer containing substantially all of the tars and carbonaceous materials originally present in the liquor and a lower ammoniacal liquor containing over 99% of the phenol originally present in the liquor. The contaminated light oil is removed at the rate of 2000 gallons per day through drain connection 8 to sump 11, from whence it is recycled to the gas suction main of a coke oven.

Ammoniacal liquor containing phenol and substantially free from tars and carbonaceous materials is withdrawn from tank 5 via line 15 and is passed to a conventional phenol recovery plant for removal of phenol. The ammoniacal liquor is first subjected to extraction with light oil, and the phenol is removed from the light oil by treatment with caustic soda to form sodium phenolate. Phenol is subsequently separated by acidification.

The resultant phenol product is free from tars and carbonaceous materials and is obtained without the process and apparatus difficulties normally encountered in operations in which the tars and carbonaceous materials are not removed.

Although certain preferred embodiments of the invention have been disclosed for purpose of illustration, it will be evident that various changes and modifications may be made therein without departing from the scope and spirit of the invention.

I claim:

1. In a process for the purification of aqueous liquor containing phenol and contaminated with tars and carbonaceous materials, the steps which comprise mixing the liquor with a solvent selected from the group consisting of benzene, toluene, xylenes and hydrocarbon fractions containing at least one of the aforementioned aromatic hydrocarbons in the proportion of about 0.5 to 10 volumes of solvent to 100 volumes of liquor, thereby producing a mixture which separates into two layers, a non-aqueous layer containing solvent and substantially all of the tars and carbonaceous materials originally present in the liquor and an aqueous layer containing liquor and relatively all of the phenol originally present in the liquor, and separating said non-aqueous and aqueous layers.

2. In a process for the purification of coke-plant ammoniacal liquor containing phenol and contaminated with tars and carbonaceous materials, the steps which comprise mixing the liquor with a solvent selected from the group consisting of benzene, toluene, xylenes and hydrocarbon fractions containing at least one of the aforementioned aromatic hydrocarbons, in the proportion of about 0.5 to 10 volumes of solvent to 100 volumes of liquor, thereby producing a mixture which separates into two layers, a non-aqueous layer containing solvent and substantially all of the tars and carbonaceous materials originally present in the liquor and an aqueous layer containing ammoniacal liquor and relatively all of the phenol originally present in the liquor, and separating said non-aqueous and aqueous layers.

3. In a process for the purification of aqueous liquor containing phenol and contaminated with tars and carbonaceous materials, the steps which comprise mixing the liquor with a solvent selected from the group consisting of benzene, toluene, xylenes and hydrocarbon fractions containing at least one of the aforementioned aromatic hydrocarbons, in the proportion of about 1 to 2 volumes of solvent to 100 volumes of liquor, thereby producing a mixture which separates into two layers, a non-aqueous layer containing solvent and substantially all of the tars and carbonaceous materials originally present in the liquor and an aqueous layer containing liquor and relatively all of the phenol originally present in the liquor, and separating said non-aqueous and aqueous layers.

4. In a process for the purification of coke-plant ammoniacal liquor containing phenol and contaminated with tars and carbonaceous materials, the steps which comprise mixing the liquor with a solvent selected from the group consisting of benzene, toluene, and hydrocarbon fractions containing at least one of the aforementioned aromatic hydrocarbons, in the proportion of about 1 to 2 volumes of solvent to 100 volumes of liquor, thereby producing a mixture which separates into two layers, a non-aqueous layer containing solvent and substantially all of the tars and carbonaceous materials originally present in the liquor, and an aqueous layer containing ammoniacal liquor and relatively all of the phenol originally present in the liquor, and separating said non-aqueous and aqueous layers.

5. In a process for the purification of aqueous liquor containing phenol and contaminated with tars and carbonaceous materials, the steps which comprise mixing the liquor with light oil containing benzene, toluene and xylenes, in the proportion of about 1 to 2 volumes of light oil to 100 volumes of liquor, thereby producing a mixture which separates into two layers, a light oil layer containing substantially all of the tars and carbonaceous materials originally present in the liquor and a liquor layer containing relatively all of the phenol originally present in the liquor, and separating said light oil and liquor layers.

6. In a process for the purification of coke-plant ammoniacal liquor containing phenol and contaminated with tars and carbonaceous materials, the steps which comprise mixing the liquor with light oil containing benzene, toluene and xylenes, in the proportion of about 1 to 2 volumes of light oil to 100 volumes of liquor, thereby producing a mixture which separates into two layers, a light oil layer containing substantially all of the tars and carbonaceous materials originally present in the liquor and a liquor layer containing relatively all of the phenol originally present in the liquor, and separating said light oil and liquor layers.

7. In a process for the purification of aqueous liquor containing phenol and contaminated with tars and carbonaceous materials, the steps which comprise mixing the liquor with benzene, in the proportion of about 1 to 2 volumes of benzene to 100 volumes of liquor, thereby producing a mixture which separates into two layers, a benzene layer containing substantially all of the tars and carbonaceous materials originally present in the liquor and a liquor layer containing relatively all of the phenol originally present in the liquor, and separating said benzene and liquor layers.

8. A process for the purification of aqueous liquor containing phenol and contaminated with tars and carbonaceous materials which comprises mixing the liquor with light oil containing benzene, toluene and xylenes, in the proportion of about 1 to 2 volumes of light oil to 100 volumes of liquor, thereby producing a mixture which separates into two layers, a light oil layer containing substantially all of the tars and carbonaceous materials originally present in the liquor and a liquor layer containing relatively all of the phenol originally present in the liquor, separating said light oil and liquor layers, and recovering the phenol from said liquor layer.

9. A process for the purification of coke-plant ammoniacal liquor containing phenol and contaminated with tars and carbonaceous materials which comprises mixing the liquor with light oil containing benzene, toluene and xylenes, in the proportion of about 1 to 2 volumes of light oil to 100 volumes of liquor, thereby producing a mixture which separates into two layers, a light oil layer containing substantially all of the tars and carbonaceous materials originally present in the liquor and a liquor layer containing relatively all of the phenol originally present in the liquor, separating said light oil and liquor layers, and recovering the phenol from said liquor layer.

References Cited in the file of this patent

UNITED STATES PATENTS

| | | |
|---|---|---|
| 1,830,725 | Ulrich | Nov. 3, 1931 |
| 1,989,177 | Tiddy | Jan. 29, 1935 |
| 2,369,022 | Cooper et al. | Feb. 6, 1945 |
| 2,761,563 | Waterman et al. | Sept. 4, 1956 |